Aug. 22, 1933.　　　　P. KRUSE　　　　1,923,937
BLANK CUTTING MACHINE
Filed June 14, 1932　　　7 Sheets-Sheet 1
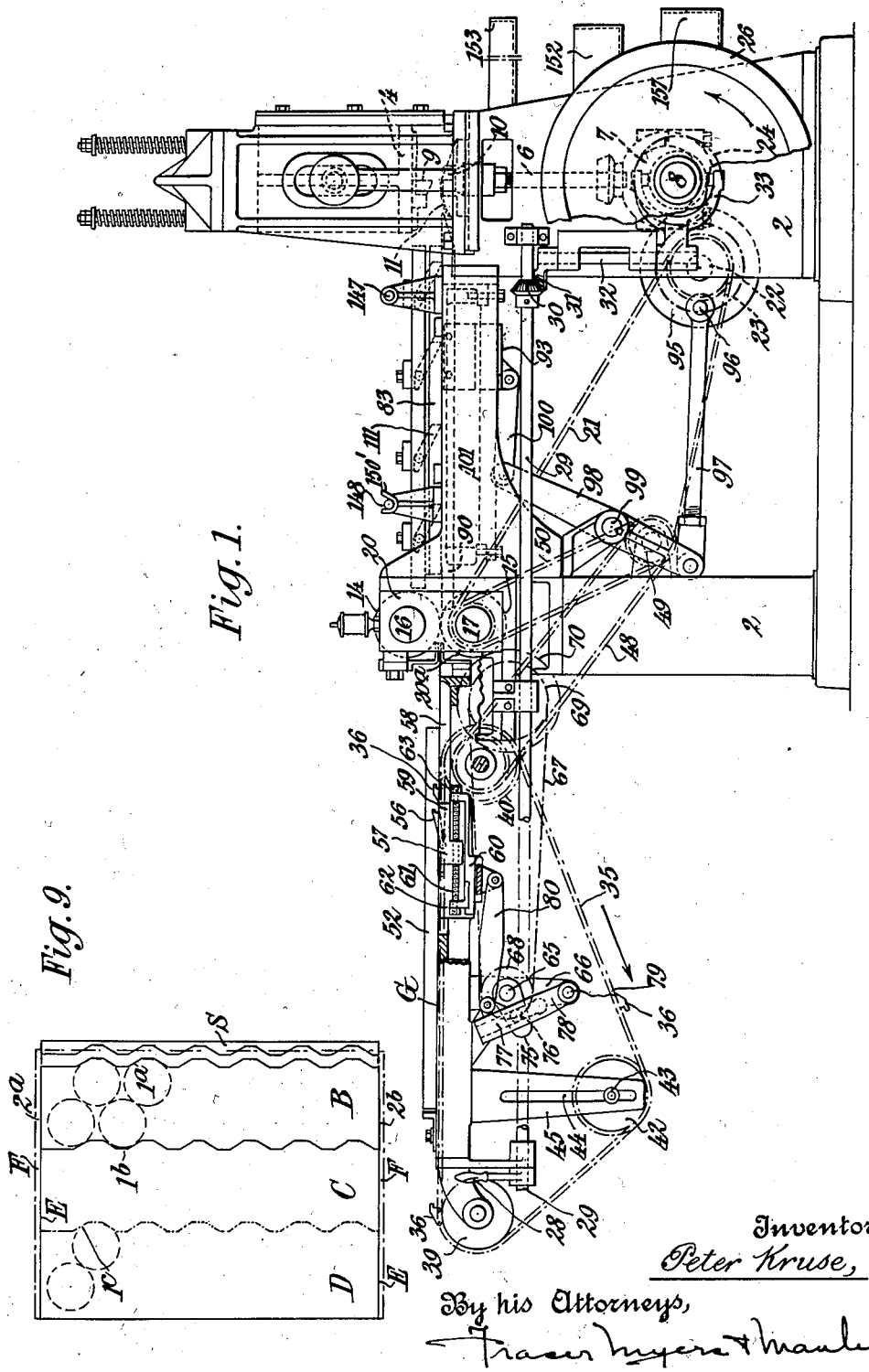
Inventor
Peter Kruse,
By his Attorneys,

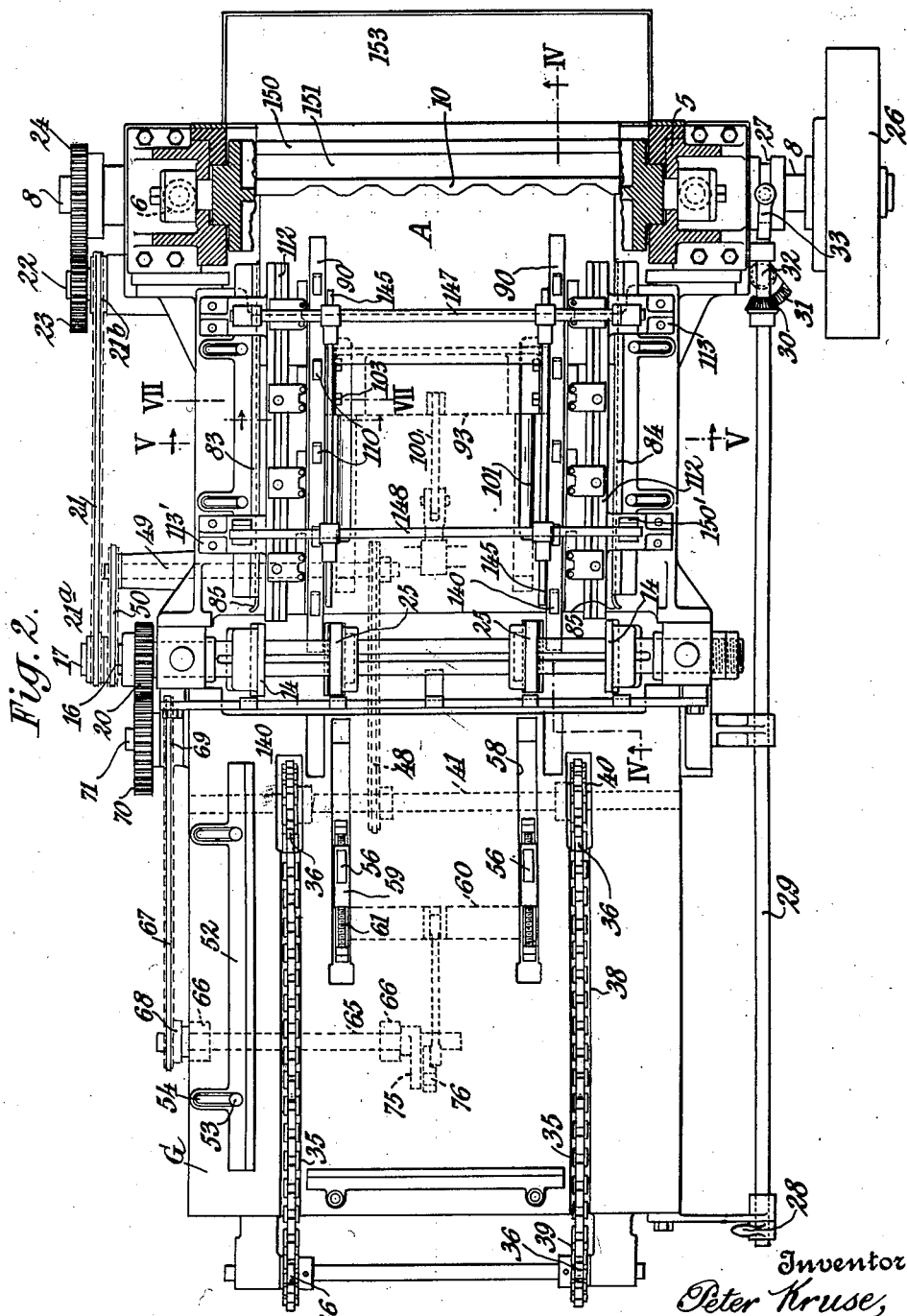

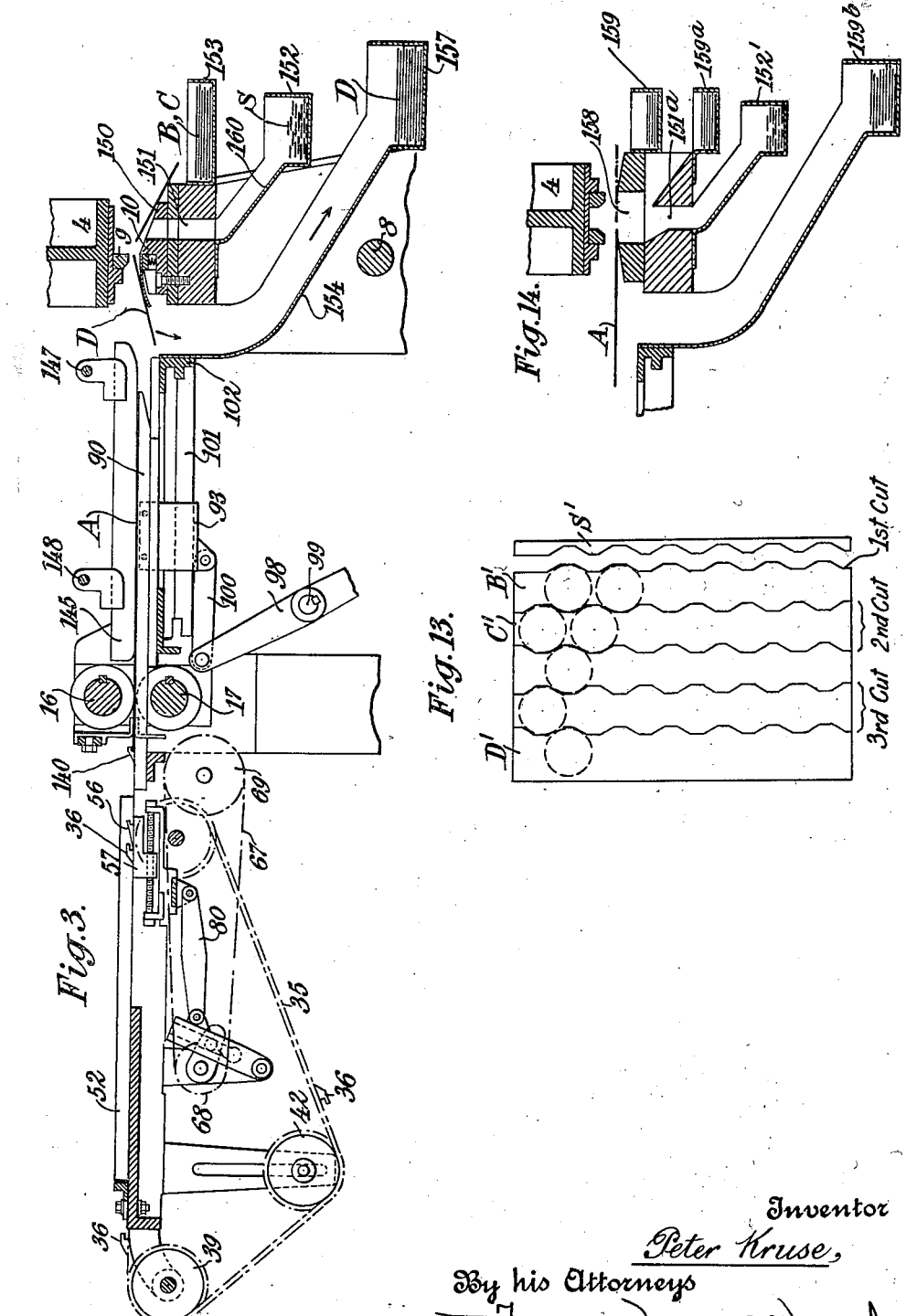

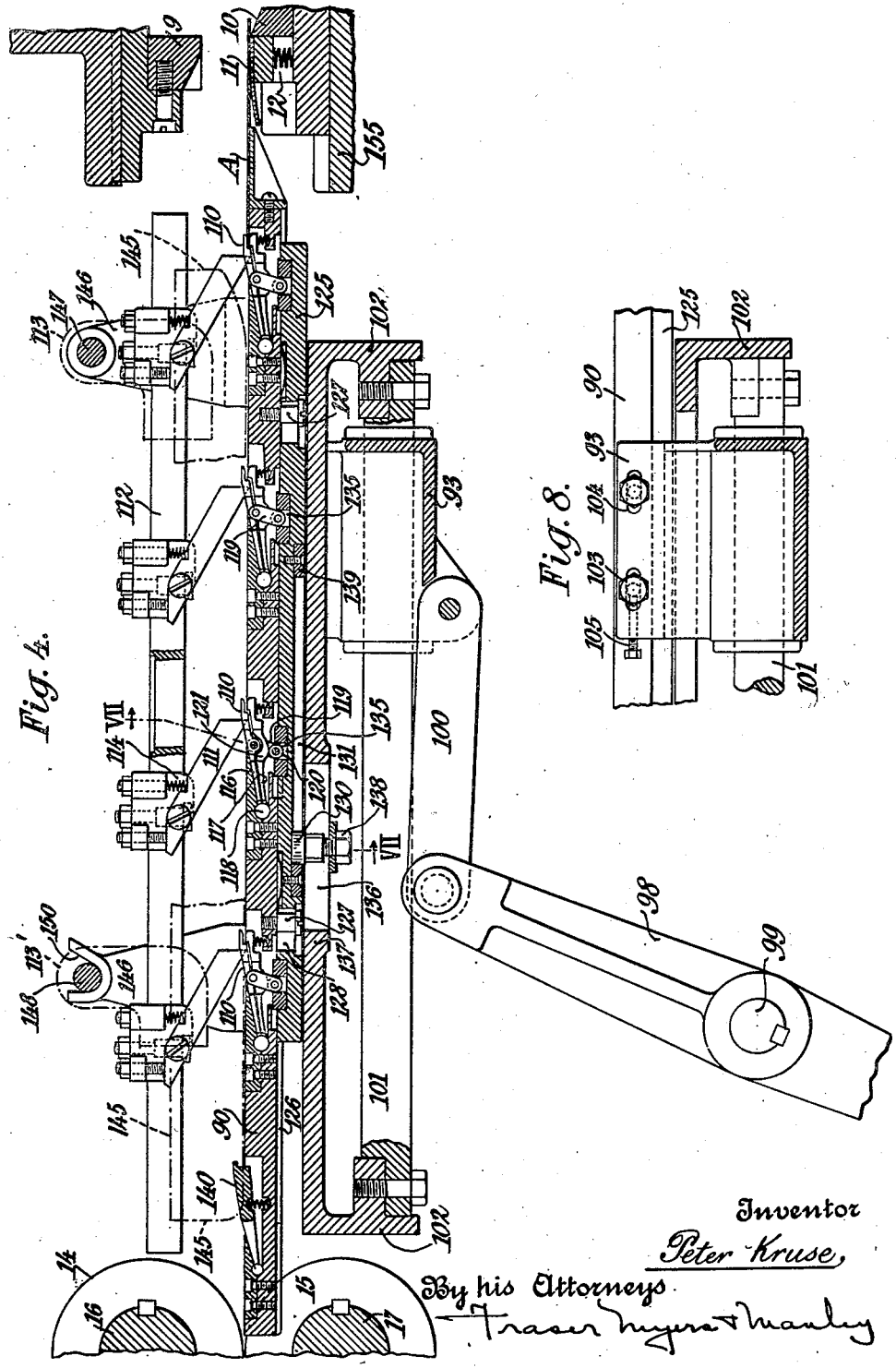

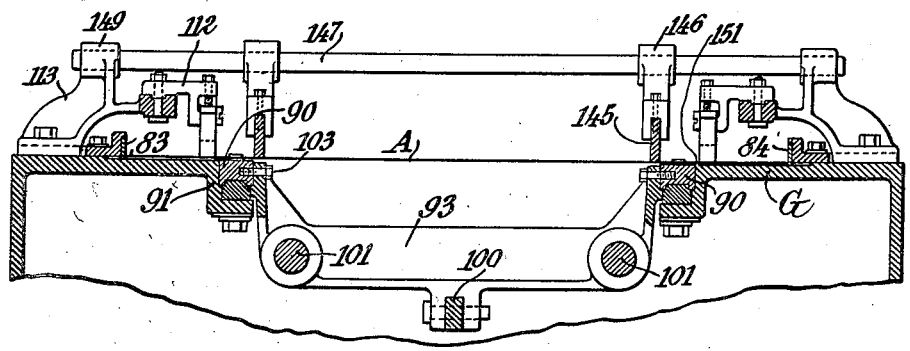
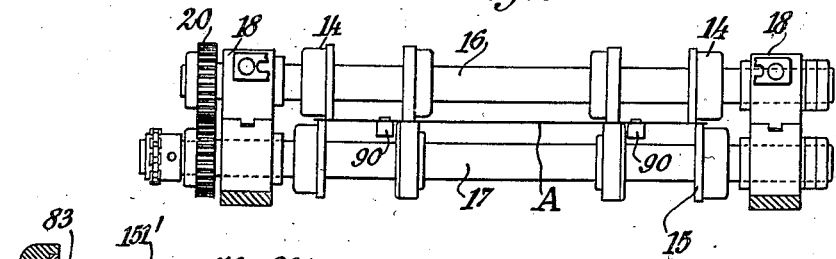
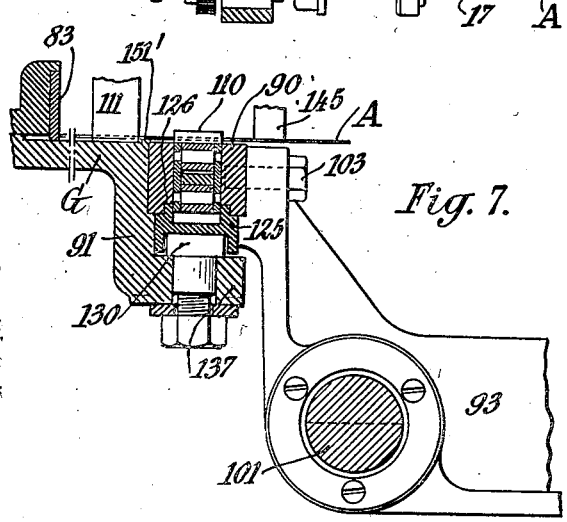

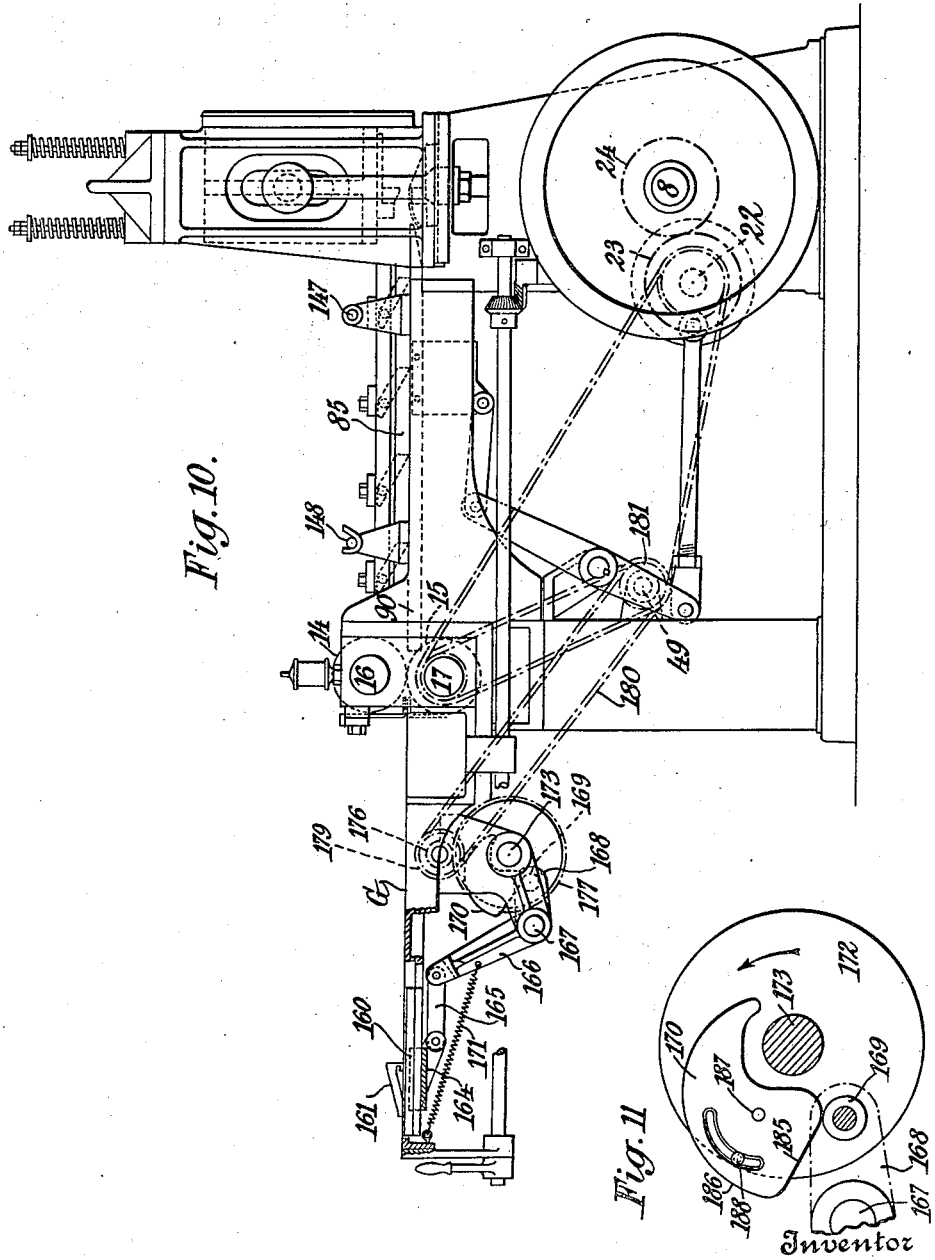

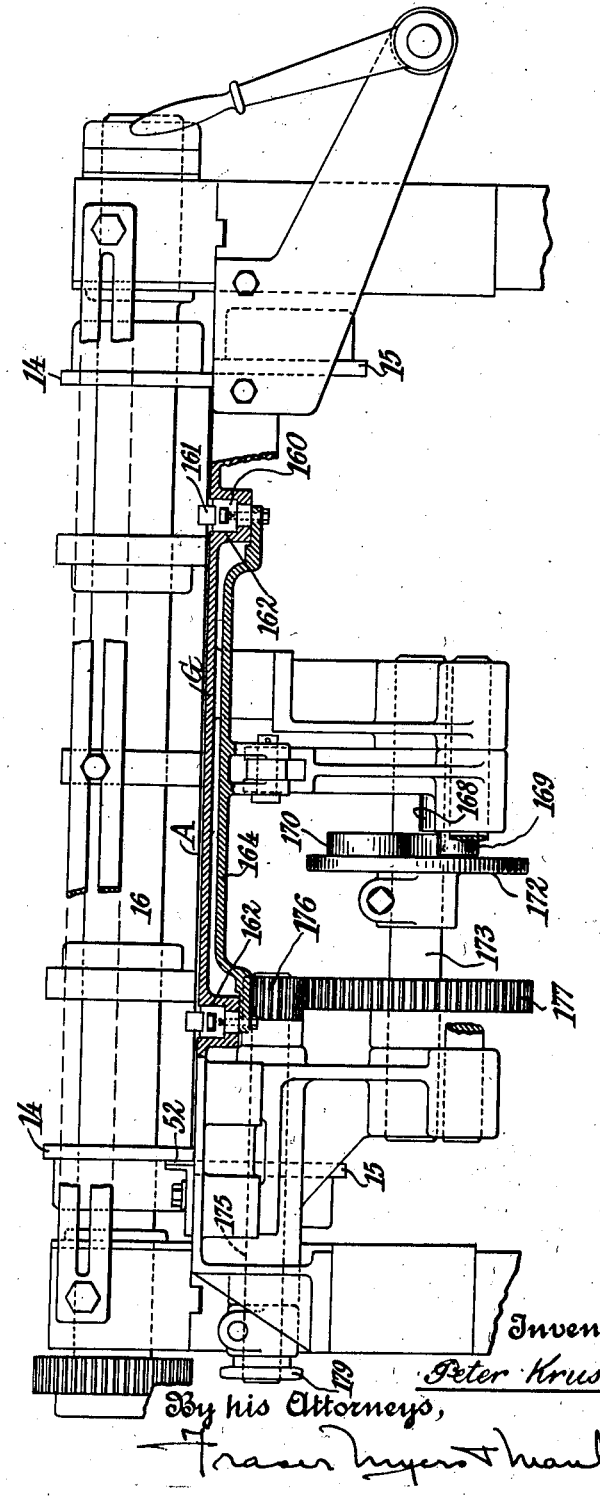

Patented Aug. 22, 1933

1,923,937

UNITED STATES PATENT OFFICE 1,923,937

BLANK CUTTING MACHINE

Peter Kruse, Brooklyn, N. Y., assignor to E. W. Bliss Company, Brooklyn, N. Y., a Corporation of Delaware Application June 14, 1932. Serial No. 617,079

10 Claims. (Cl. 164—48)

This invention relates to blank cutting mechanism and is particularly applicable to scroll shear presses for cutting out accurately sized blanks from which a multiplicity of smaller blanks are subsequently punched out. The invention is, however, generally applicable to the cutting out of blanks of any desired form.

The invention has for its object to provide improved blank-cutting mechanism in which accurate registration of successive cuts in the same sheet may be obtained in a simple and reliable manner.

Another object of the invention resides in the combination of side trimming rolls with reciprocating scroll-shear press mechanism, the former producing accurately gauged and parallel side edges as the sheet is advanced through the machine, while the latter serves to produce a series of transverse scroll cuts as the gauged sheet is intermittently advanced.

Another object of the invention is to provide accurate registering mechanism whereby the intermittently advanced sheet is brought into accurately predetermined relationship with respect to the scroll cutting dies.

A further object of the invention is to provide mechanism for trimming the side edges of sheets in such manner that the sheets are presented to the scroll-shear mechanism with accurately gauged parallel and straight edged sides so that the pattern cut by the scroll-shear will always occupy a predetermined relationship with respect to the side edges of the sheet.

Further objects of the invention reside in constructional details and the cooperation of parts, as will hereinafter appear.

In the following description reference is had to the accompanying figures wherein Fig. 1 is a side elevation of the mechanism according to the preferred form of the invention.

Fig. 2 is a plan view of the same; portions of the scroll-shear head being broken away to better illustrate the underlying parts.

Fig. 3 is a vertical, longitudinal cross-section taken along the line III—III of the mechanism shown in Fig. 2.

Fig. 4 is a somewhat enlarged vertical, longitudinal cross-section taken along the line IV—IV of Fig. 2, and shows details of the sheet-feeding and registering mechanism.

Fig. 5 is a fragmentary, vertical, transverse cross-section taken along the line V—V of the mechanism shown in Fig. 1.

Fig. 6 is a front elevation of the shearing-rolls as employed in the above construction.

Fig. 7 is a fragmentary, vertical, transverse section taken along the line VII—VII of Figs. 2 and 4, and drawn to a somewhat enlarged scale.

Fig. 8 is an enlarged fragmentary side elevation showing details of connection between one of the feed-bars and the actuating cross-head.

Fig. 9 shows the arrangement of blanks as cut by the mechanism illustrated in the above described figures.

Fig. 10 is a side elevation of a machine generally similar to that illustrated in Fig. 1, except for the substitution of a modified sheet-feeding mechanism for advancing the sheets to the side trimming rolls.

Fig. 11 is an enlarged side elevation showing details of the cam for actuating the slide which initially feeds the sheet to the side trimming rolls in the modified construction according to Fig. 10.

Fig. 12 is a somewhat enlarged front elevation of the modified construction shown in Fig. 10, certain portions being broken away to better show the modified feed mechanism.

Fig. 13 shows an arrangement of blanks that may be cut from a sheet by using a box die which makes two scroll cuts simultaneously.

Fig. 14 shows diagrammatically the box die arrangement that may be substituted for the single die, as shown, for example, in Fig. 3.

The embodiment of the invention illustrated in Figs. 1 to 8, inclusive, is adapted, for example, to receive metal sheets and to cut the same into a series of scroll-edged blanks, which are subsequently fed through automatic die presses which cut out and form a multiplicity of can tops from each of the said blanks. Blanks formed by the operation of this machine are shown in Fig. 9, the scroll cut edges appearing at $1^a$, $1^b$, and the straight edges at $2^a$, $2^b$. The arrangement of can tops to be subsequently cut from the blank in another machine is indicated by the circles 3 shown in dotted lines. Since the primary object of providing scroll-edged blanks is to achieve the greatest possible economy of metal in subsequently punching out the can tops, it will be apparent that the blanks should be cut accurately to the required size. Oversize blanks would result in waste of material, while undersize blanks would result in defective can tops. Furthermore, it will be apparent that a marked advantage is gained in so cutting the blanks that a single cut suffices to form the scroll edge of adjacent blanks in the sheet. In other words, the scroll cut which forms the edge $1^b$ of blank B will at the same time form a scroll edge for the succeeding blank in the sheet A corresponding to edge $1^a$ of blank B. In this manner succeeding blanks are cut out without any waste of material between them. In the construction illustrated a single scroll-cutting die is employed, the sheet being intermittently advanced so that the said die successively shears off the portion of the sheet which is fed beyond it, the first cut removing only so much scrap as is necessary to insure an accurately cut scroll edge corresponding to 1ª. This scrap S is shown severed from sheet A. After the sheet is advanced and accurately positioned, a second cut is made to form a scroll edge 1ᵇ, thus completing blank B. A third cut made along dotted line 1ᶜ completes blank C. The machine as shown is arranged to cut two of such blanks from a sheet, although it may be adjusted to cut any desired number of blanks from a single sheet. The final cut 1ᶜ also completes the last blank D, which differs from the preceding blanks in that it has but one scroll-cut edge. Such single scroll-cut edge, together with the straight side edges suffice, however, to permit the blank D to be subsequently registered in an automatic top cutting press, for example, just as accurately as the normal blank having two scroll-cut edges.

The machine provides for automatically collecting the last blanks D and the pieces of scrap S at points removed from the position to which the normal blanks B, C, are delivered, as will hereinafter more fully appear.

From the foregoing it will be apparent that it is of great importance that the successive cuts which the scroll die makes in the sheet should be accurately registered with respect to the sheet. The usual commercial sheets obtained from the mill do not have accurately cut edges, and it is therefore impracticable to use such edges for effecting registration of the successive shearing operations. Because of this fact, it has hitherto been the practice to provide dies which would not only make a scroll cut transversely of the sheet but would also notch the advancing corners thereof whereby to provide registering points which are employed as gauge-points in positioning the sheet at the time the next succeeding scroll cut is made.

According to the present invention the above described difficulty has been overcome by combining with the reciprocating scroll-cutting die a pair of shear rolls which initially trim away the irregular lateral margins of the sheet, there being also provided special means for feeding the sheet between the said shear rolls so that accurately cut and parallel straight edges E, E are first formed as the sheet advances through the machine, a narrow strip of scrap material F being cut away from each side of the sheet by this first operation, as shown in Fig. 9. The straight edges E, E thus formed constitute the lateral edges of the blanks, the shear rolls being positioned so as to trim the sheet to the exact width desired. Thereafter the blanks are completed by the successive engagements of the scroll-shear which severs a blank from the sheet after each successive advance of the intermittent fed mechanism.

The preliminary trimming of the side edges as aforesaid, makes possible the accurate transverse registration of the subsequent scroll-cuts relative to the straight side edges of the sheet, this resulting in the production of blanks of uniformly accurate pattern. Such blanks are therefore particularly well adapted to be subsequently handled in automatic presses, the accurate relationship of at least one scroll-cut edge to a straight side edge in each blank permitting close registration, thus reducing to a minimum the amount of scrap and spoilage.

As best seen in Fig. 1, the mechanism comprises a rigid frame 2, which may be of any suitable construction, this frame providing a flat bed along which the sheets are fed. At the rear of this frame is disposed a reciprocating scroll-shear press of conventional design. The reciprocating die head 4, slidably guided in the vertical uprights 5 of the frame, is actuated by two pitmen 6, one on each side, these pitmen being driven by eccentrics 7 carried by drive-shaft 8. The reciprocating head 4 carries the upper die 9 of the scroll-shear, the mating lower die 10 being rigidly secured to the stationary bed of the press. Details of these dies are best seen in Figs. 2 and 4. The lower die 10 is provided with a yielding blank support 11, which is normally held by a spring 12 in a position to guide the sheet A over the cutting edge of the lower die 10. When the upper die 9 descends the blank support 11 yields sufficiently to permit the shearing of the sheet between the two dies.

Toward the middle of the bed along which the sheets A are fed, the side shear rolls 14, 15 are mounted, as seen in Figs. 1, 2 and 6, these rolls being carried on transverse driving shafts 16, 17 respectively, which are journaled in upright frame members 18. These two shafts are geared together by gears 20, one of which appears in Fig. 2, there being a corresponding gear 20ª of the same size on the lower shaft 17. Power is applied to the lower shaft by a chain and sprocket drive 21, 21ª, 21ᵇ connecting said shaft with an intermediate shaft 22 which is geared directly to the main drive-shaft 8 by pinion 23 and gear 24. In addition to the two shear-rolls carried by each of shafts 16 and 17, the said shafts each carry two friction rolls 25, the upper and lower friction rolls of each pair cooperating to frictionally engage the sheet metal when it is introduced between the shear-rolls, and thus afford a continuous drive to propel the sheet between the said shear-rolls. Both the shear-rolls and the friction-rolls are slidably keyed upon the upper and lower shafts so that they may be adjusted to operate on sheets of various widths. Ordinarily, the sheets are but slightly wider than the desired width of blank which is to be cut out, the shear-rolls being adjusted to remove only a narrow marginal strip of scrap from each side of the sheet. Power may be applied to the main drive-shaft 8, in any suitable manner. In the present instance the machine is belt-driven, the fly wheel pulley 26 being rotatively mounted at one end of the shaft 8, conventional clutch means 27 being provided to connect the pulley with the shaft when it is desired to place the machine in operation. The clutch is controlled by hand lever 28 within convenient reach of the operator, who stands at the front of the machine. This lever is mounted at one end of longitudinal rock-shaft 29, the opposite end of which carries a bevel-pinion 30 meshing with bevel-toothed sector 31 which actuates a vertical rock-shaft 32 at the lower end of which is rigidly secured the usual clutch-shifting fork 33.

In order to achieve the required accurate advance of the sheet, cooperating feed mechanisms are employed to enter the sheet between the trimming rolls and thereafter to intermittently advance the sheet to receive the successive cuts of the reciprocating scroll-shear.

In the embodiment illustrated in Figs. 1 to 9 inclusive the parallel feed-chains 35 which are provided at suitable intervals with feed-fingers 36. These chains lie within parallel slots 38 formed in the flat top of the platform or bed along which the sheets are fed, the feed-fingers 36 projecting upwardly so as to engage the edge of a sheet which is manually deposited on the platform. The chains pass over idler-sprockets 39 at the forward end of the machine (to the right in Figs. 1 and 2); then along the platform to driving sprockets 40 mounted on a transverse drive shaft 41; thence around vertically adjustable idler-sprockets 42 and returning to sprockets 39. Each of the idler-sprockets 42 is carried on a stud 43 which is slidably adjustable within a vertical slot 42 formed in a depending bracket 45 secured beneath the platform, this construction permitting of individually tightening feed-chains 35. Sprocket drive-shaft 41 is connected by chain and sprocket drive 48 with an intermediate shaft 49, which is in turn connected by chain and sprocket drive 50 with shaft 17 which carries the lower shear-rolls and which receives power from the main-drive shaft in the manner hereinbefore described.

At one side of the platform G an adjustable straight-edged guide-bar 52 is secured by means of bolts 53 passing through transverse slots 54 formed in said bar. The operator deposits a sheet on the platform so that its side edge engages guide-bar 52, the sheet being then advanced by chain feed-fingers 36 toward the roll-shear. It is of great importance that the sheet be positively and accurately fed between the shearing-rolls 14, 15 in order to avoid any tendency for the sheet to travel in other than a straight path. Unless special provision is made to insure the forced introduction of the sheet between the shear-rolls in an accurately determined path, the sheet will frequently be deflected in its progress through the rolls so that its edges are not cut straight. This would make it impracticable to use such edges substantially for registering the sheet with respect to the scroll-shear.

To insure the straight-line feed of the sheet through the shear-rolls, particularly at the moment when it is first introduced therebetween and most likely to be deflected, a second feed is provided comprising a pair of reciprocating feed-fingers 56. These feed-fingers are pivoted in slide-blocks 57, which are slidably guided in slotted guideways 58 formed in the feed-platform G. Feed-fingers 56 are of conventional design, being urged upwardly to the sheet-engaging position as indicated in Fig. 1, by means of a compressed spring 59 housed within slide-block 57. The pressure exerted by said spring is only sufficient to elevate the feed-finger into operative position, the finger being depressed so as to lie flush with the top of the feed-platform whenever the finger is required to pass beneath a sheet which is being advanced by feed chain-fingers 36. Slide-blocks 57 are adjustably mounted upon a slidable cross-head 60 by means of screw-threaded rods 61 rotatively mounted at each end in bearings 62 formed in said cross-head 60. By rotating threaded adjusting rod 61, blocks 57 are shifted longitudinally to the desired position and there locked by tightening nuts 63 which lock rods 61 against rotation. The cross-head carrying feed-finger 56 is actuated by a special accelerating link movement as follows:

A transverse shaft 65 journalled in bracket-arms 66 depending from platform G, receives power through a chain and sprocket drive 67, 68, 69. Sprocket 69 is secured to the hub of a gear 70 rotatively carried upon stud 71, said gear meshing with a gear 20 secured upon the lower roll shear shaft 17, which receives power from the main drive-shaft 8 in the manner hereinbefore described. On the inner end of shaft 65 a crank-arm 75 is rigidly secured. The crank-pin 76 of crank-arm 75 slides in a slot 77 formed in rocker-arm 78, which is pivoted at its lower end upon a rock-shaft 79 which is journalled in bearings provided at the lower ends of sprocket-arms 66. The upper end of the rocker-arm 78 is connected with the feed-finger cross-head 60, hereinbefore described, by a link 80. Crank-arm 75 rotating in the direction of the arrow, counter-clockwise, as viewed in Fig. 1, imparts a reciprocating motion to cross-head 60, but because crank-pin 76 in its travel along slot 77 in rocker-arm 78, acts at a varying radius with respect to the pivotal axis of said rocker-arm, the arm will be swung in a clockwise direction at a more rapid rate than it will be returned by the further revolution of the crank-arm. Starting from the position indicated in Fig. 1, it will be seen that the rocker-arm 78 will be swung through its maximum arc by an angular movement of approximately 130° of the crank-arm, the remaining 230° of crank-arm motion being required to restore rocker-arm 78 to its initial position.

The advantage of the above described link motion is that while it affords the desired acceleration to bring the sheet which is fed thereby up to the required speed to be forcibly introduced between the shear-rolls 14, 15, and follow up the motion of the sheet so as to maintain directing pressure against the retreating edge thereof during the initial portion of the travel of the sheet through the shear-rolls, it affords a relatively long interval during which the sheet may be deposited in a position to be engaged by the feed-fingers 56. This interval is approximately twice that which would be available if, instead of the special link motion above described, a simple crank and pitman motion were employed to actuate the feed-finger cross-head. The position of the feed-fingers relative to the cross-head is preferably adjusted so that the sheet is introduced between the shear-rolls almost immediately after the cross-head commences its motion toward the rolls, the action of constant speed chain-feed 35 being so timed that it will locate a sheet in a position to be engaged by the feed-fingers 56 by the time said fingers have attained a feeding velocity substantially equal to that of the uniform velocity of the chain-feed. In this manner there is avoided any shock which might otherwise tend to deflect the sheet at the moment when the feeding function is transferred from feed-fingers 36 to reciprocating feed-fingers 56. Immediately following this transfer of function, the sheet will be accelerated by the action of the link motion as hereinbefore set forth, and thus forcibly entered between the shear-rolls, the feed-fingers maintaining pressure against the retreating edge of the sheet at two widely separated points so as to positively direct the course of the sheet until it is securely engaged between the rolls. The sheet then continues to advance, due to the tractive effort of the rolls, and upon emergence is engaged by accurately spaced lateral guide-bars 83, 84. Thereafter the course of a sheet will be accurately maintained by the directing effect of the said guide-bars which closely engage the trimmed edges of the sheet. These guide-bars are identical in construction with guide-bar 52, hereinabove described, except that they are provided with rounded ends 85 where the sheet enters, to insure against the corner of the sheet being caught as it enters between said guides.

The further progress of the sheet is controlled by a third feed mechanism which carries the sheet from the shear-rolls to successive accurately determined positions. The step-by-step advance of the sheet under the control of the third feed and registering mechanism determines the width of blank that is to be sheared off by the reciprocating scroll-shear, and consequently it is of great importance that the movement of the sheet to successive positions be accurately determined. The feed mechanism for accomplishing this result comprises a pair of parallel reciprocating feed-bars 90. These bars are slidably guided in guideways 91 formed integrally with the flat bed G, the upper surface of the feed-bars lying substantially flush with the flat surface of the bed along which the sheets are fed, as best seen in Fig. 5. The feed-bars 90 are connected together by a cross-head 93 which is actuated through linkage, best illustrated in Fig. 1. At the inner end of intermediate shaft 22 driven by the main-shaft 8 through gearing 23, 24, as hereinbefore described, a crank-disk 95 is rigidly secured. This disk carries crank-pin 96, which actuates connecting-rod 97, the opposite end of said rod being pivoted to the lower end of the rocker-arm 98 supported on transverse rock-shaft 99, the upper end of said rocker-arm being connected by a link 100 with feed-bars cross-head 93. To avoid throwing the weight of the cross-head on the feed-bars a pair of parallel cross-head guides 101 are provided, these comprising round rods secured at each end to depending webs 102 formed integrally with the bed or frame of the machine. Feed-bars 90 are adjustably secured to cross-head 93 by screws 103, which pass through slots 104 in the cross-head wall, as best seen in Figs. 7 and 8, a longitudinal adjusting screw 105 threaded into the cross-head wall and bearing against screw 103, being provided to facilitate accurate adjustment by each of the feed-bars relative to the cross-head.

The feed-bars 90 are each provided with a plurality of gripper-fingers 110 of special design, the latter being covered by United States Patent No. 1,694,387, issued to me December 11, 1928, to which reference may be had for a more detailed description of said gripper-fingers. These gripper-fingers are automatically controlled, so that when they engage the edge of a sheet, their upper and lower gripping members or jaws stand open. Thereafter, during the advance of the feed-bars, the jaws are automatically brought together, thus firmly gripping the sheet. Upon each advance of the feed-bars the sheet is carried slightly beyond spring-pressed stripping-fingers 111. These stripping-fingers are adjustably mounted upon a stationary frame 112 supported on brackets 113 at each side of the platform G. The fingers 111 are yieldingly pressed toward the platform by springs 114 (Fig. 4) so that they ride freely over the sheet as the latter is advanced, but immediately drop into sheet-engaging position after the sheet has passed beyond them, so that when the feed-bars retreat the gripper-fingers 110 carried thereby will draw the sheet firmly into contact with the said stripping-fingers 111, which, upon the continued retreat of the feed bars, strip the sheet from the frictional grasp of the said gripper-fingers. In this manner the sheet is accurately positioned to be acted upon by the scroll-shear dies 9, 10.

The gripper-fingers 110 comprise upper and lower jaw members 116, 117, pivoted at 118. The upper jaw 116 pivotally carries a U-shaped link 119 at the bottom of which is a cam-roller 120, which acts upon a cam-surface 121 formed on the lower face of jaw 117. The contour of this cam-surface is such that when link 119 is swung to the right, as viewed in Fig. 4, the jaws open, a reverse motion of the link forcibly drawing the jaws together. In Fig. 4 the jaws are shown in their gripping position. It will be understood that they do not come tightly together, because allowance must be made for the thickness of the sheet A, as indicated at the right of the figure where the sheet is shown engaged between the jaws of the last gripper-finger in the series.

The simultaneous operation of the four gripper-fingers in each of the feed bars 90 is controlled by a lost-motion trip-bar 125, which is slidably guided in guideway 126 formed in the lower face of feed-bar 90 (Fig. 7), the trip-bar being retained in said guideway by screws 127 extending upwardly into the feed-bar 90, through slots 128 in the trip-bar. The lower face of said trip-bar is centrally slotted to receive an abutment 130. This slot, appearing at 131, is of such length that it permits a free run of the trip-bar 125 almost the entire length of the stroke of feed-bar 90, but when the feed-bar approaches its extreme forward position, as indicated in Fig. 4, abutment 130 comes in contact with the left-hand end of slot 131, thus forcibly shifting the trip-bar 130 to the left relative to feed-bar 90. This simultaneously closes the jaw of each of the gripper-fingers 110, the actuating links 119 of which are controlled by such relative motion of the trip-bar. It will be seen that each of the links extend downwardly into recesses 135 formed in said trip-bar, the cam-rollers 120 at the lower end of the links being engaged by the walls of said recesses. In order to achieve a certain latitude in the timing of the gripper-fingers 110, abutment 130 which controls the trip-bar is adjustably mounted in a longitudinal slot 136 formed in the stationary frame member 137, the abutment being locked in a desired adjustment by means of nut 138. A further adjustment of the timing for the opening and closing of the gripper fingers may be obtained by substituting impact blocks of a different size from those indicated at 139. These blocks are located at each end of slot 131, and are made readily replaceable for the purpose of varying the timing as above set forth and also to permit of replacement should they become worn.

It will be noted that at the extreme left of the feed-bars, simple feed-fingers 140 are provided, as seen in Fig. 4, these corresponding to feed-fingers 56 which enter the sheets between the shear-rolls as hereinbefore set forth. The feed-bars 90, upon their retreating stroke, are carried to the position indicated in dotted lines in Fig. 2, so that the fingers 140 serve to carry the sheet from the position to which it is advanced by the shear-rolls to a point where the rear edge of the sheet may be engaged by the first pair of gripper-fingers 110. Ordinarily, the tractive effort of the shear-rolls 14, 15, and friction-rolls 25 cooperating therewith, would be sufficient to carry the sheet entirely through the rolls, but the reach of feed-bars 90 is preferably such that the fingers 140 engage the sheet before it has passed completely through the rolls, thus insuring that the sheet will be fed therethrough in properly timed relationship with the step-by-step action of feed-bars 90.

It will be noted that gripper-fingers 110 and feed-finger 140 on each of the feed-bars, are designed to yieldingly drop flush with the surface of the bar when they are required to pass beneath a sheet upon their retreating motion, the action being the reverse of that of stripper-fingers 114, which rise to permit the sheet to be fed thereunder but drop behind the latter to prevent the sheet from being carried along with the retreating gripper-fingers.

In order to prevent accidental displacement of the sheet and to insure the effective engagement of the gripper-fingers as they advance toward the trailing edge thereof, a pair of friction-bars 145 are provided. These are held in proper alignment by brackets 146 which are secured to transverse supporting bars 147, 148. The ends of transverse bar 147 are journalled in bearings 149 formed in the frame brackets 113 which also carry the tripper-finger frame 112. The ends of rod 148 lying freely within U-shaped rests 150' formed integrally with frame brackets 113'. In this manner friction-bars 145 are free to articulate about the axis 147, being yieldingly held against the sheets by their own weight. As best seen in Fig. 7, the sheet A does not lie in contact with the flat surface of platform G, but is carried at a slight elevation above such surface on longitudinal guides 151'. This permits friction-bars 145 to accommodate themselves to the sheet and apply substantially uniform friction throughout the entire length thereof, due to the slight capacity of the sheet to yield under pressure. The arrangement has the further advantage of holding the sheet in such position that the stripper-fingers 111 can drop slightly beneath it, thus insuring against any possibility of the sheet being carried beneath said fingers when it is drawn in contact therewith by gripper-fingers 110.

The operation of the foregoing mechanism may be briefly summarized as follows:

Sheets manually placed on the platform G in contact with side guide 52 are advanced at a uniform speed by fingers 36 on constant speed feed-chain 38. Prior to entering shear-rolls 14, 15, the trailing edge of the sheet is engaged by the second or accelerating feed mechanism comprising fingers 56 positively driven by the accelerating link motion 75, 78, etc., which afford a positive driving feed to accurately enter the sheet between the shear-rolls. Upon emergence the trimmed edges of the sheet are engaged by guides or gauge-bars 85, between which the sheet is subsequently guided. Thereafter, the sheet is engaged by feed-fingers 140 carried by reciprocating feed-bars 90 and advanced to a position where, after the next retreat of the feed-bars, the sheet will be engaged by the first set of gripper-fingers 110. The subsequent advance of the feed-bars carries the sheet just beyond the first set of stripper-fingers 111 which drop behind the sheet so that the latter is stripped from the gripper-fingers and accurately positioned to receive the first cut of the scroll-shear dies 9, 10, the sheet being held against any corresponding displacement by friction-bars 145, as hereinbefore set forth. Thereafter the sheet is advanced so as to be accurately registered with respect to the second set of stripper-fingers when the second scroll cut is made, thus completing the first blank. This process is repeated until the sheet A has been advanced to the position indicated in Fig. 4, where it receives the final cut of the scroll-shear dies.

As shown in Fig. 9, three differently shaped pieces are cut from a sheet by the scroll-shear. The first cut removes the narrow strip of scrap S, the second cut forming the normal blank B, and the third cut forming a second normal blank C, the same cut also leaving the single scroll-edged blank D. The machine is designed to automatically separate the scrap and the two differently shaped blanks.

As best seen in Fig. 3, the lower die 10 is provided with an inclined face 150, along which the end portions severed from the sheet will slide under their own weight. A transverse slot 151 formed in said inclined face communicates with a chute which leads to a collecting tray 152. The width of slot 151 is sufficient to permit the narrow strip of scrap that is first sheared from the end of the sheet to fall threely therethrough, the scrap S collecting in the tray 152. After the scrap is removed the blanks B and C are formed, these being of such width as to extend beyond the slot 151, so that as they are severed from the sheet they slide into an upper tray 153. The blank D requiring but one scroll edge, is never advanced beyond the point indicated in Fig. 4, and when the dies makes the final cut which divides the sheet into blanks C and D, the latter falls rearwardly from the face of the die and is conveyed along chute 154 to the lower tray 157. In this manner, like pieces cut from succeeding sheets are automatically segregated in their respective trays.

It will be understood that the mechanism according to the present invention may be used in conjunction with a wide variety of dies. If, for example, it is desired to form scroll-edged blanks, as shown in Fig. 13, a box die may be employed. Such a die is diagrammatically shown in Fig. 14. In this case the feed mechanism hereinbefore described will require no change. The sheet A will be advanced to the position shown in Fig. 14, where the first cut removes the scrap strip S'. This scrap falls within the hollow lower die 158, then through slot 151ᵃ into tray 152'. The succeeding advance of the sheet brings it to the position indicated in dotted lines, where it will receive two scroll cuts, the forward edge of the box die severing a blank B' from the end of the sheet, which drops into tray 159, while the rear edge of the die severs a second blank C' from the sheet, the latter blank dropping through the hollow die and sliding into tray 159ᵃ. Thereafter the feed is again advanced the width of two blanks, and the above described operation is repeated until the final cut is made. The last cut leaves a single scroll-edged blank B', which falls backward from the inclined face of the die and is conveyed to tray 159ᵇ. With the foregoing arrangement it will be understood that the sheet is advanced the width of two blanks at each stroke of the feed-bars and the box-die at each stroke severs two blanks from the sheet, one blank falling outside the die and the other falling within the latter.

By suitably adjusting the stroke of the feed-bars and the position of the stripping-fingers hereinbefore described, the machine may be set to cut blanks of various widths, and may be readily adapted for use in connection with a variety of dies other than those herein described.

The modification illustrated in Figs. 10, 11 and 12 differs from the previously described embodiment in that the first two feed mechanisms of the said embodiment are replaced by a single unit. Instead of combining a constant speed feed chain with a reciprocating accelerator feed, there is provided in the modified construction a single cam-controlled variable speed feed for accomplishing a like purpose. As seen in Figs. 10 and 12, reciprocating feed blocks 160 carrying feed-fingers 161 are slidably mounted in parallel guideways 162 formed in platform G, the feed-fingers projecting above the surface of the platform so as to engage the edge of a sheet deposited thereon by the operator. As in the previously described construction, a side-guide or gauge-bar 52 is provided to locate the sheet transversely in proper relationship to the shear-rolls 14, 15. Feed-blocks 160 are rigidly secured to a crosshead 164, which is connected by a link 165 with the upper arm 166 of a bell-crank pivoted at 167. The lower arm 168 of said bell-crank carries a cam-roller 169 which is held in engagement with a cam 170 by means of a tension spring 171 acting on the upper arm 166 of the bell-crank. Cam 170 is adjustably secured on the face of a disk 172 rigidly mounted on transverse shaft 173, which receives power from an intermediate chain-driven shaft 175 through pinion 176 and gear 177 (Fig. 12). Shaft 175 carries a sprocket 179 connected by chain 180 with a corresponding sprocket 181 mounted at the inner end of shaft 49, which receives power from the lower shaft 17 of the scroll-shear in the manner hereinbefore described.

Cam 170 is so designed that it automatically effects the desired timing and acceleration of the sheet feed. As best seen in Fig. 11, the actual cam-block 170 occupies an effective operating arc of less than 150°, the remaining 210° of rotation of the disk 172 being performed idly, thus permitting feed-fingers 161 to remain at rest in the position indicated in Fig. 10. This long dwell affords ample time for the operator to properly locate a sheet in position to be engaged by feed-fingers 161, and also insures the proper timing of successive sheets so that there can be no interference between a sheet about to be fed and the previously fed sheet which has been entered between the shear-rolls 14, 15, and which is thereafter advanced by the step-by-step feed effected through the operation of feed-bars 90, as hereinbefore described. Following this dwell, the cam rotating counter-clockwise, as viewed in Figs. 10 and 11, cam-roller 169 is engaged by the steep incline 185 of the cam, which, during the succeeding angular movement of approximately 45°, effects the full, forward-feeding stroke of feed-fingers 161, thereby entering the sheet between shear-rolls 14, 15, and positively advancing it until it is accurately started and securely engaged between said rolls. Upon emergence, the trimmed side-edges of said sheet are engaged by the lateral guides 85, as hereinbefore set forth, in connection with the previously described embodiment. Thereafter, the further rotation of cam 170 permits feed-fingers 161 to be drawn back to the starting position, this motion occurring at a considerably slower speed than the forward feed, and being controlled by the long arcuate cam surface 186 of decreasing radius.

It will be noted that cam 170 is adjustably secured to the disk 172, being pivoted upon a stud 187 and held in a desired angular adjustment by means of a screw 188, which passes through arcuate slot 189 formed in the cam, the screw securely clamping the cam to driving disk 172. It will be readily seen that by varying the angular setting of the cam-pivot 187, the rate of advance of the feed-fingers may be controlled, the adjustment varying the pitch of cam-incline 185. The operation of the foregoing modification requires no further explanation, inasmuch as the modified feed above described cooperates with roll-shear, intermittent-feed, and scroll-shear mechanism identical with that of the first embodiment, with respect to which the operation has been fully set forth.

It will be understood that the invention is not limited to the forms hereinbefore specifically described, but may be otherwise variously embodied or modified without departing from the spirit of the invention as set forth in the following claims.

What I claim is:

1. A machine for cutting blanks from a sheet, comprising intermittently acting transverse shearing mechanism, means for intermittently feeding the sheet in a direction toward said shearing mechanism, yielding means for imparting a relatively small opposite movement to the sheet after each of said feeding movements, and a plurality of equally spaced stops adapted to successively limit the latter movements of the sheet prior to each successive engagement of said shearing mechanism and thereby accurately locate each previously sheared edge of said sheet successively in the same relative position with respect to said shearing mechanism, whereby a succession of uniform blanks will be cut from the said sheet.

2. A machine for cutting blanks from a sheet, comprising intermittently acting transverse shearing mechanism, means for intermittently feeding the sheet in a direction toward said shearing mechanism, means frictionally engaging said sheet and adapted to impart opposite movement to the sheet after each of said feeding movements, and a succession of equally spaced positive stop means to limit the latter movements of said sheet prior to each successive engagement of said shearing mechanism and thereby accurately locate each previously sheared edge of said sheet successively in the same relative position with respect to said shearing mechanism, whereby a succession of uniform blanks will be cut from the said sheet.

3. A machine for cutting blanks from a sheet, comprising a reciprocating transverse shearing mechanism, reciprocating feed means adapted to intermittently feed the sheet in a direction toward the shearing mechanism, sheet-gripping means reciprocating with said feed means, and a succession of equally spaced strippers operative in successively advanced positions to strip the sheet from the engaged gripping means upon relatively small movement of the latter away from the said shearing mechanism, the latter operation which occurs prior to each successive engagement of said shearing mechanism serving to accurately locate each previously sheared edge of said sheet successively in the same relative position with respect to said shearing mechanism, whereby a succession of uniform blanks will be cut from the said sheet.

4. A machine for cutting blanks from a sheet, comprising a reciprocating transverse shearing mechanism, a reciprocating feed slide moving toward and away from said shearing mechanism, a plurality of sheet-grippers carried by said slide, a plurality of positively acting strippers located at successive stations along the path of said slide, each movement of said slide being sufficient to advance the sheet from one station to the next, and automatic means to set at least one of the grippers in sheet-gripping condition while the slide is moving the sheet toward the shearing mechanism, the said gripper during the reverse movement of said slide retaining its grip on the sheet until said sheet is stripped from the gripper by being brought into engagement with at least one of said strippers, the latter operation which occurs prior to each successive engagement of said shearing mechanism serving to accurately locate each previously sheared edge of said sheet successively in the same relative position with respect to said shearing mechanism, whereby a succession of uniform blanks will be cut from the said sheet.

5. Sheet feeding mechanism for automatic presses and the like, comprising a reciprocating feed-slide, a plurality of sheet-grippers carried at different points longitudinally of said slide, a relatively movable control device adapted to set a plurality of such grippers in sheet-gripping condition during the advance of said slide, means adapted to control the movement of said device whereby to time the action of said grippers, and a plurality of strippers located at successive stations along the path of said slide, the movement of said slide toward the press being adapted to advance a sheet from one station to the next, the succeeding opposite movement of the slide causing the sheet to be drawn into contact with a stripper and thus accurately positioned at the latter station, the continued retreat of the slide pulling the engaged gripper away from the positioned sheet and bringing the next succeeding gripper into a position to engage the sheet upon a subsequent forward movement of the said reciprocating feed slide.

6. Sheet-feeding mechanism according to claim 5, further characterized in that said sheet-grippers are provided with individual gripper-actuating elements, the said control device being formed as a slide which operatively engages said elements, said control slide being freely slidable with the said reciprocating feed slide during a part of the stroke of the latter, and stop means to limit the run of said control slide and thereby induce relative motion between the said slides whereby to operate the said gripper-actuating elements.

7. Sheet-feeding mechanism, comprising a reciprocating feed-slide, a plurality of mechanically actuated sheet-grippers moving with said slide, a control slide adapted upon relative motion with respect to said feed slide to control the gripping engagement of said grippers with the sheet, said control slide being freely slidable with said reciprocating feed-slide during a part of the stroke of the latter, and stop means to limit the run of said control slide whereby to effect relative motion between said slides and thereby control the said engagement of the grippers.

8. Mechanism for feeding sheets between power-driven roll-shears, said mechanism comprising automatic feed means adapted to engage a sheet which is deposited in its path of motion, and means to accelerate the velocity of the sheet after it has been engaged by said feed means, the said accelerating means acting to bring the velocity of the sheet up to a speed at least equal to the velocity at which the sheet would be normally drawn through the power-driven shear-rolls in the absence of any feed means, said accelerating means maintaining its driving action upon the sheet until a portion of the sheet has passed through the rolls, whereby during at least the initial travel of the sheet between the rolls, a directing pressure will be exerted against the sheet.

9. Mechanism for feeding sheets between power-driven roll-shears, said mechanism comprising automatic feed means adapted to move a sheet from an initial position toward the shear-rolls and during such motion to accelerate the sheet until the velocity of the sheet upon entering the shear-rolls is at least equal to the cutting speed of the said rolls, the said feed means being adapted thereafter to follow the sheet and maintain pressure at the rear edge thereof whereby to accurately guide the sheet during the initial portion of its travel between said shear-rolls.

10. The mechanism according to claim 8, further characterized in that the said feed means comprises a constant speed feed-chain adapted to initially advance the sheet, and a reciprocating feed adapted to engage the sheet while the latter is being advanced by said feed-chain and to accelerate said sheet so that its speed upon entering the shear-rolls is somewhat in excess of the cutting speed of the said rolls.

PETER KRUSE.